(No Model.)

G. W. STOCKMAN.
WATER COOLER FOR REFRIGERATING AND ICE MACHINES.

No. 304,871. Patented Sept. 9, 1884.

Witnesses:
William A. Van Buren
Paul Hough

Inventor.
George Washington Stockman
By Minturn & Minturn
His Attorneys.

United States Patent Office.

GEORGE WASHINGTON STOCKMAN, OF INDIANAPOLIS, INDIANA, ASSIGNOR TO ISABELL STOCKMAN, OF SAME PLACE.

WATER-COOLER FOR REFRIGERATING AND ICE MACHINES.

SPECIFICATION forming part of Letters Patent No. 304,871, dated September 9, 1884.

Application filed November 15, 1883. (No model.)

*To all whom it may concern:*

Be it known that I, GEORGE W. STOCKMAN, a citizen of the United States, residing at Indianapolis, in the county of Marion and State of Indiana, have invented a new and useful Water-Cooler for Refrigerating and Ice-Making Machines, of which the following is a specification.

My invention relates to improvements in water-coolers, by which the temperature of the water contained in the cooler is lowered through the agency of the refrigerating-power of a highly-volatile gas or ether; and the object of my improvement is to reduce the temperature of the water from which the ice is to be made to as low a degree as possible before the water is introduced into the freezing-cans. I attain this object by the mechanism illustrated in the accompanying drawings, in which—

Figure 1:
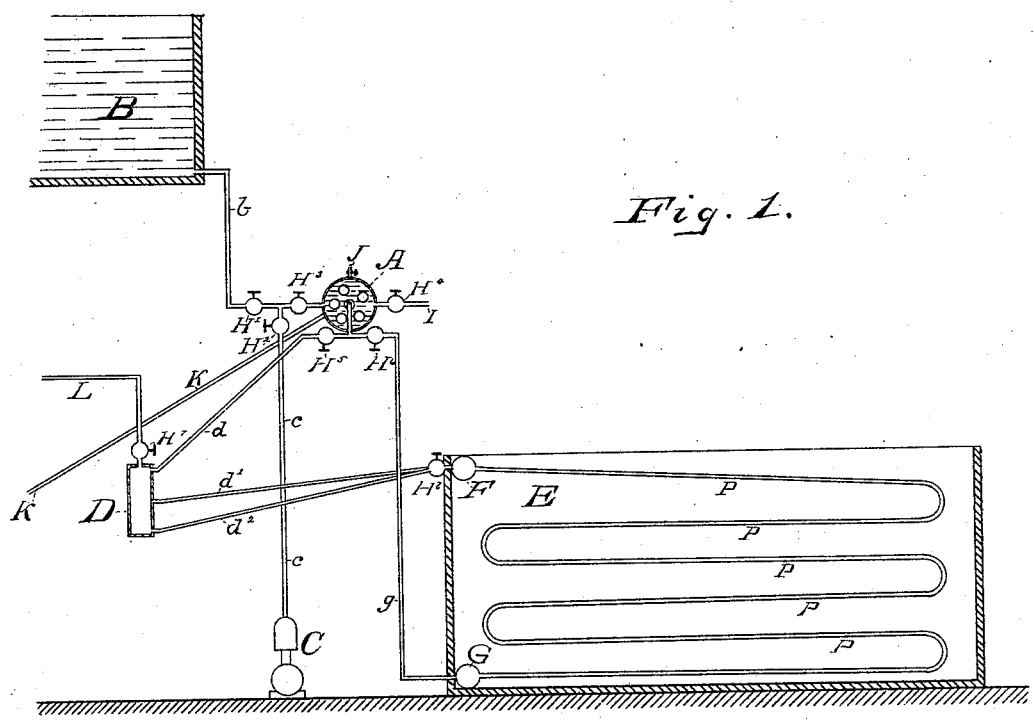
Figure 2:
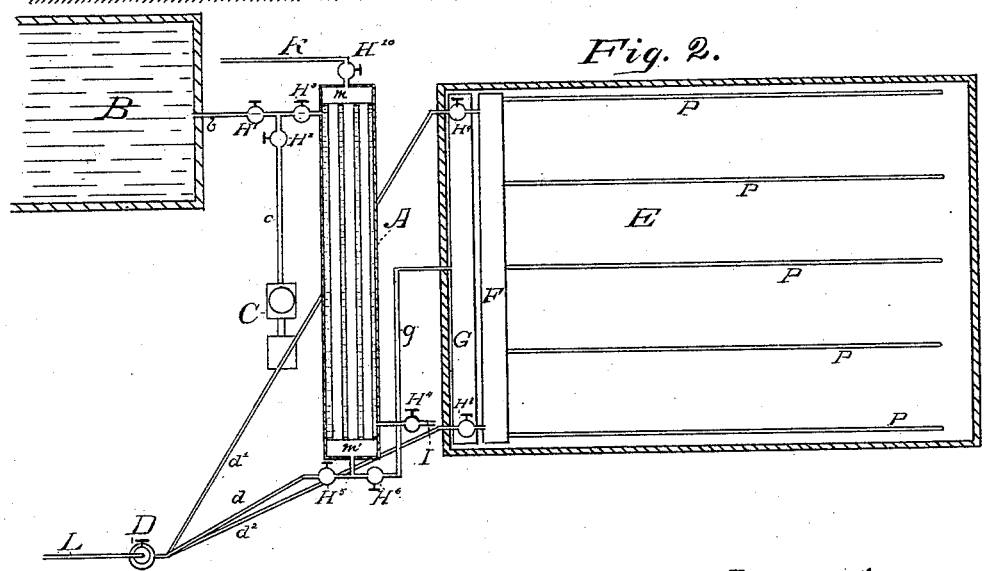

Figure 1 is a vertical section, and Fig. 2 a horizontal section or plan, of my cooler.

Similar letters refer to similar parts throughout the several views.

A is the water-cooler; B, a tank containing the water-supply for the cooler A; $b$, a pipe leading from the tank to the cooler; C, a pump for furnishing the water directly to the cooler, when so desired, without passing through the tank B; $c$, a water-pipe leading from the pump C to the cooler A; D, a liquefier where the liquefied ammonia or other gas is collected before it is allowed to expand through the refrigerating-box E; $d$, a pipe leading from the liquefier D to the water-cooler A; $d'$ and $d^2$, pipes leading from the liquefier D to the distributing-manifold F in the expansion or refrigerating box E. E is the expansion or refrigerating box; F, the distributing-manifold, and G the collecting-manifold; $g$, a pipe leading from G to A. $H'$ $H^2$ $H^3$ $H^4$ $H^5$ $H^6$ $H^7$ $H^8$ $H^9$ $H^{10}$ are stop-valves for regulating the flow of water or gas through their respective pipes. I is the outlet-pipe for the water in the cooler A. J is a petcock to admit the air to the cooler while the water is being drawn out through the pipe I. K is a pipe for carrying off the gas after it has passed through the cooler. L is the pipe through which the condensed ammonia or other gas passes in going from the evaporating-retort to the liquefier D.

$m$ and $m'$ are chambers in the opposite ends of the cooler. P P P P P are independent coils of pipe running from the distributing-manifold F to the collecting-manifold G.

The cooler A is a long tubular vessel, of sheet-iron, having at each end the chambers $m$ and $m'$, partitioned off from the body of the vessel and connected by a number of pipes, which run parallel with the side of the cooler and empty from one chamber into the other. The chamber $m'$ is connected by the pipe $g$ with the collecting-manifold G in the bottom of the expansion-box, and by the pipe $d$ with the liquefier D. The chamber $m$ in the opposite end has an outlet-pipe, K, connecting it with the balance of the refrigerating apparatus, which, not being necessary to illustrate my invention, is not shown in the drawings. The central chamber or body of the cooler is connected by the pipe $b$ with the reservoir B, and by the pipe $c$ with the pump C, and the water entering the cooler through these pipes is emptied through the pipe I. The liquefier D is the receptacle for the condensed gas, which is here collected in a liquefied form as it comes from the evaporating-retort. From D the liquefied gas is conveyed through the pipes $d'$ and $d^2$ to the distributing-manifold F, and also through the pipe $d$ to the water-cooler A. The independent coils of pipe P P P P P lead from the distributing-manifold F and empty into the collecting-manifold G. From G the partially-spent gas which has just come through the pipes P is forced through the pipe $g$ into the chamber $m'$ in the cooler A, where it passes, by means of the parallel pipes, into the chamber $m$ at the opposite end of the cooler, and from there is discharged through the pipe K.

The practical working of my machine is as follows, viz: The water from the tank B is admitted into the cooler A by opening the stop-valves $H'$ and $H^3$; or, if preferable, the valve $H'$ may be closed and the valves $H^2$ and $H^3$ opened and the water pumped directly from the force-pump C through the pipe $c$ into the cooler, where in both cases it fills the central chamber or body of the vessel. The liquefied gas in the liquefier D is forced by pressure through the pipes $d'$ and $d^2$ into the distributing-manifold F in the upper end of the expansion-box E. Here it is allowed to expand and exert its refrigerating-power, and after passing through the coils P is collected in the collecting-manifold G. The refrigerating-power of the gas at this stage is never more than partially exhausted, and instead of immediately absorbing it in dilute liquid and carrying it directly to the evaporating-retort to be evaporated I utilize the remaining refrigerating-power by passing a sufficient portion of the gas through the pipe $g$ into the chamber $m'$. This chamber $m'$, as before described, is connected by the parallel pipes with the chamber $m$, and the gas is free to circulate from one chamber to the other.

The body of the cooler, as already explained, is filled with water, which completely envelops the pipes connecting the chambers $m$ and $m'$, and the gas circulating from $m'$ to $m$ through the parallel pipes abstracts the heat by virtue of its refrigerating-power from the water, and, passing out through the pipe K, leaves the water reduced in temperature.

The valve $H^{10}$ is to regulate the flow of gas from the cooler.

If preferred, instead of utilizing the partially-spent gas from the expansion-box, the stop-valve $H^6$ in the pipe $g$ may be closed and the valve $H^5$ in the pipe $d$ opened, and the fresh liquid gas admitted directly from the liquefier D.

The gas and the water should enter the cooler at opposite ends of the vessel.

When the water in the cooler is wanted for any purpose, the valve $H^3$ in the supply-pipe is closed and the valve $H^4$ in the drain-pipe I opened, and when the petcock J on the top of the cooler is turned to admit the air the water will flow from the pipe I.

The drain-pipe I should be attached to the bottom of the cooler instead of the side, as shown in the drawings, as when the cooler is to stand without attention for any length of time it is necessary that it be free from water to prevent its freezing up; and to drain all of the water from the cooler it is necessary that the drain-pipe be connected at the bottom.

Having thus fully described my invention, what I claim as new, and wish to secure by Letters Patent, is—

1. In refrigerating and ice-making machines, the water-cooler A, so constructed that the partially-spent gas from the expansion or refrigerating box E may pass through the cooler A while the cooler is filled with water, and after exerting its remaining refrigerating-power in cooling the water pass out of the cooler without becoming itself absorbed by the water therein, substantially as described, and for the purposes specified.

2. In refrigerating and ice-making machines, the water-cooler A, so constructed that condensed gas from the liquefier D may pass through the cooler A while the cooler is filled with water, and after exerting its refrigerating-power in cooling the water pass out of the cooler without becoming itself absorbed by the water therein, substantially as described, and for the purposes mentioned and set forth.

3. The water-cooler A, with inside longitudinal pipes connecting the chamber $m'$ with the chamber $m$ and forming a conduit for a current of refrigerating-gas from the expansion-box E or from the liquefier D, the gas entering the chamber $m'$ through the pipe $g$ or through the pipe $d$, and passing out of the opposite chamber, $m$, through the pipe K, the central chamber or body of the cooler to be filled with water, which enters the cooler from the tank B through the pipe $b$, or from the pump C through the pipe $c$, and and is discharged through the pipe I, the cooler being provided with the petcock J, and the pipes $b$, $c$, $d$, $g$, I, and K with the stop-valves $H'$ $H^2$ $H^3$ $H^5$ $H^6$ $H^4$ $H^{10}$, respectively, and all being arranged and combined as described, and for the purposes specified.

4. The water-cooler A, so arranged that the water to be cooled may be supplied from the tank B or directly from the pump C, as described and specified.

5. In a water-cooler, the shell A, chamber $m'$, chamber $m$ and connecting-pipes, the pipe $g$, valve $H^6$, pipe $d$, valve $H^5$, pipe K, valve $H^{10}$, pipe $b$, valves $H'$ and $H^3$, pipe $c$ and valve $H^2$, pipe I and valve $H^4$, and the petcock J, all combined as described, and for the purposes mentioned and set forth.

GEORGE WASHINGTON STOCKMAN.

Witnesses:
L. W. MANSFIELD,
AMOS L. KREWSON.